United States Patent [19]

Tanaka et al.

[11] 4,308,371

[45] Dec. 29, 1981

[54] PROCESS FOR PREPARING THERMOSETTING ORGANOPOLYSILOXANE

[75] Inventors: Kazunobu Tanaka; Koichiro Arita, both of Ohimachi, Japan

[73] Assignee: Daicel Chemical Industries, Ltd., Osaka, Japan

[21] Appl. No.: 154,686

[22] Filed: May 30, 1980

[30] Foreign Application Priority Data

Jun. 14, 1979 [JP] Japan .................................. 54/74919

[51] Int. Cl.³ ............................................ C08G 77/06
[52] U.S. Cl. ...................................... 528/18; 427/387;
428/411; 428/412; 428/500; 428/532; 528/10;
528/33; 528/34
[58] Field of Search ........................ 528/10, 18, 34, 33

[56] References Cited

U.S. PATENT DOCUMENTS 3,759,867  9/1973  Merrill et al. .......................... 528/18
3,792,012  2/1974  Zdaniewski ........................... 528/10

Primary Examiner—Melvyn I. Marquis
Attorney, Agent, or Firm—Blanchard, Flynn, Thiel, Boutell & Tanis

[57] ABSTRACT

A process for preparing a thermosetting organopolysiloxane which is soluble in an organic solvent, comprising subjecting to a hydrolyzing condensation reation one or a mixture of two or more alkoxysilanes having the formula $$R_a^1Si(OR^2)_{4-a}$$

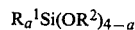

in which $R^1$ is selected from the group consisting of alkyl, substituted alkyl, alkenyl and aryl; $R^2$ is alkyl having 1 to 4 carbon atoms; and a is an integer of 0, 1 or 2, in the presence, from the initial stage of the reaction, of a hydrolzyed partial condensation product of trialkoxysilane having the above-identified formula in which a is 1.

5 Claims, 2 Drawing Figures

PROCESS FOR PREPARING THERMOSETTING ORGANOPOLYSILOXANE

This invention relates to a process for preparing a thermosetting organopolysiloxane which is soluble in an organic solvent and particularly relates to a process for preparing a thermosetting organopolysiloxane characterized in that the hydrolyzing condensation reaction of one or a mixture of two or more alkoxysilanes having the formula $$R_a^1Si(OR^2)_{4-a}$$

in which $R^1$ is selected from the group consisting of alkyl, substituted alkyl, alkenyl and aryl; $R^2$ is alkyl having 1 to 4 carbon atoms; and a is an integer of 0, 1 or 2, is carried out in the presence, from the initial stage of the reaction, of a hydrolyzed partial condensation product of a trialkoxysilane having the above-identified formula in which a is 1.

A known process for obtaining an organopolysiloxane of a high molecular weight comprises hydrolyzing an organic silane compound having the formula $$R_nSiX_{4-n}$$

in which n is an integer of 0 to 2; R represents an organic radical; and X represents halogen, an acyl group or an alkoxy group, to obtain an organic silanol compound which is then subjected to dehydration condensation under specific conditions. This process is described in detail in "Encyclopedia of Polymer Science and Technology" edited by H. F. Mark and N. G. Gaylord; Interscience Publishers, 12, pages 497–510, "Chemistry and Technology of Silicones" written by Walter Noll; Academic Press, 1968, pages 190–233, J. Am. Chem. Soc., 77, pages 3990–4002 (1955), etc.

Particularly, it is known to form an extremely hard coating film, which is excellent in transparency, abrasion resistant property and solvent resistance, on a plastic material, such as polymethyl methacrylate or polycarbonate, by hardening under heating an organopolysiloxane that has been obtained by the hydrolyzing condensation reaction of a trialkoxysilane or the hydrolyzing copolycondensation reaction of a trialkoxysilane and a tertraalkoxysilane. The former process is disclosed in, for instance, Japanese Patent Publication No. 49(1974)-45,320, Japanese Patent Publication No. 49(1974)-15,079 and Japanese Patent Publication No. 51(1976)-27,707, as well as West German Offenlegeschrift No. 2,113,734, and the latter process is disclosed in, for instance, Japanese Patent Publication No. 50(1975)-28,446.

In carrying out the process, the hydrolysis of an alkoxysilane can be generally accelerated by adding an acid catalyst or an alkaline catalyst to the reaction solution. However, the process has the drawbacks stated below.

(1) Lack of reproducibility in controlling the reaction. The acid catalyst is added in a small amount, and the reaction rate is greatly affected by even a minor difference of the amount of the catalyst added. Therefore, a desired partial condensation product can scarcely be obtained with high reproducibility. Rather, the reaction product may be obtained in the form of gel due to the condensation reaction proceeding too far. Alternatively, insoluble matter may precipitate during storage of the product due to a poor condensation reaction.

(2) An acid catalyst, such as hydrochloric acid which is generally employed in the process, requires special technical precautions for protecting the material of the reaction vessel from corrosion. It is emphasized that an installation requiring large capital investment, such as glass lining, is necessary, because the acid catalyst may escape following the by-produced alcohol during distillation of the reaction product.

(3) Possible contamination of the by-produced alcohol with a small amount of the catalyst.

(4) A salt may be produced by the catalyst residue and the hardening catalyst thereby causing the hardened film to be opaque.

As a result of a detailed study of the hydrolyzing condensation reaction of alkoxysilanes, in particular, tri- or tetraalkoxysilanes, the present inventors have discovered that the presence of an already hydrolyzed partial condensation product of a trialkoxysilane (hereinafter sometimes called the seed catalyst), from the start of the reaction, can surprisingly accelerate the hydrolysis of a di-, tri- or tetraalkoxysilane. The present invention has been completed based on this finding.

This discovery is a fundamental one in studying the hydrolysis of an alkoxysilane, and a variety of the technical effects of the present invention described hereinafter can be achieved by utilizing this discovery, as set forth above. The present invention, for the first time, makes it possible to prepare an organopolysiloxane with high purity and thus can obviate the drawbacks of the conventional process described above.

The effects achieved by employing the present invention include, for instance, the following:

(1) That acceleration of the reaction rate imparted by the seed catalyst, according to the invention, is high, and yet the reproducibility of the reaction is satisfactory and the reaction is highly controllable, because the functional effects of the seed catalyst are less dependent on its concentration than is the case with the conventional acid catalyst.

(2) The seed catalyst as such can be condensed in the course of the reaction to join completely homogeneously in the reaction product of the reaction system to which the seed catalyst is added. Thus, the drawbacks observed in the conventional processes, such as corrosion of the material of the reaction vessel due to the residue to the conventional catalyst, the gelation occuring due to the catalyst residue when a partial condensation product of an organopolysiloxane is evaporated under heating to obtain a solid organopolysiloxane, the unsatisfactory influence on the pot life of the hardening solution and the cloudiness of the hardened film obtained, are not observed in the process according to the invention.

(3) Since the by-produced alcohol is not contaminated, it can be, as such, employed as a diluting solvent for the coating solution or also it can be employed as such for other uses, with no intervening purification process. Thus, the process is advantageous from an economical point of view.

The alkoxysilane employed in the invention is a di-, tri- or tetraalkoxysilane having the chemical formula $R_a^1Si(OR^2)_{4-a}$, in which a is 0, 1 or 2, $R^1$ is an alkyl group, a substituted alkyl group, an alkenyl group or an aryl group, and $R^2$ is an alkyl group having 1 to 4 carbon atoms such as methyl, ethyl, n-propyl, isopropyl, n-butyl, 1-methylpropyl, 2-methylpropyl or t-butyl.

Examples of the alkoxysilane of the formula set forth above include dimethyldiethoxysilane, diethyldiethoxysilane, methyltriethoxysilane, ethyltriethoxysilane, γ-glycidoxypropyltrimethoxysilane, γ-methacryloxytrimethoxysilane, N-β-aminoethyl-γ-aminopropyltrimethoxysilane, vinyltriethoxysilane, phenyltriethoxysilane, tetraethoxysilane and tetrabutoxysilane.

The present invention resides in the preparation of an organopolysiloxane having an appropriate condensation ratio, by a process in which an already hydrolyzed partial condensation product of the trialkoxysilane is added to the reaction system at the beginning of the hydrolyzing condensation reaction of the alkoxysilane of the formula set forth above. The organopolysiloxane obtained by the reaction is soluble in, for instance, alcohols, ethers, ketones, aromatic hydrocarbon solvents, chlorinated hydrocarbon solvents, and mixtures of one of these solvents and an organic acid. The organopolysiloxane can be hardened under heating in the presence of a hardening catalyst to give a thermosetting film or molded product.

There is no specific limitation on the degree of the condensation level of the hydrolyzed partial condensation product of the trialkoxysilane having the aforementioned formula in which a is 1, that serves as a seed catalyst for accelerating the hydrolysis reaction of the alkoxysilane, so long as the condensation product is soluble in an organic solvent. The seed catalyst can be prepared by a variety of processes, such as the process of the present invention, a process conventionally employed involving an acid or alkaline catalyst, or a process involving no catalyst, etc. The seed catalyst is added in an amount of not less than 0.1 part by weight, preferably not less than 0.5 part by weight, per 100 parts by weight of the starting alkoxysilane. There is no critical upper limit on the amount of the seed catalyst. For instance, the hydrolysis reaction of a tetraalkoxysilane can be carried out in the presence of 80 parts by weight of a hydrolyzed partial condensation product of a trialkoxysilane to obtain a co-polycondensation product. However, an excessively hardened organopolysiloxane which is insoluble in an organic solvent is not appropriate for use as the seed catalyst, because a gel is apt to be formed in the final product. For the same reason, the present invention excludes the use of a seed catalyst consisting of a hydrolyzed condensation product of a tetraalkoxysilane which is apt to undergo gelling in the course of the hardening reaction.

The seed catalyst can be incorporated into the reaction mixture, by dissolving a liquid or solid seed catalyst in the starting alkoxysilane, adding a solution of the seed catalyst in an alcohol or one of the other solvents for the alkoxysilane, or employing other processes.

Water is added in a molar amount of (4−a)/2 or more, per one mole of the charged alkoxysilane that is to be hydrolyzed and condensed. This is because water produced in the hydrolysis reaction can supplement the remaining part of the necessary water, as illustrated below.

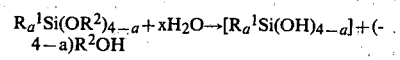

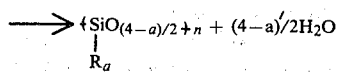

The molar amount of water to be charged into the reaction system is preferably less than 10 moles, per one mole of the charged alkoxysilane. If a mixture of a trialkoxysilane and a tetraalkoxysilane is employed as the starting material, the value of a is calculated on the average basis. If the amount of water added to the reaction system is more than 10 moles, per one mole of the starting alkoxysilane compound, the reaction mixture undesirably undergoes gelling. In practical application of the process of the invention, water is preferably charged into the reaction system in an amount ranging from 2 to 5 moles, per one mole of the charged alkoxysilane.

The reaction temperature preferably ranges from room temperature to the reflux temperature of the by-produced alcohol. The hydrolysis rate decreases as the reaction temperature is lowered. However, the hydrolysis can be completed within 4 hours because of the use of the seed catalyst, even if the reaction is carried out at room temperature. At a temperature around the reflux temperature of the by-produced alcohol, the reaction including the condensation reaction phase requires approximately 10 hours for completion. The condensation reaction is highly active, and even at room temperature the reaction can advantageously proceed. However, a temperature below room temperature is not preferred because the hydrolysis requires a relatively longer time. A temperature above the reflux temperature of the by-produced alcohol is also not preferred because the reaction is thereby necessarily carried out under pressure.

According to the process of the invention, which comprises incorporating the seed catalyst into the reaction mixture at the initiation of the reaction, the time required for mixing the seed catalyst homogeneously with the reaction mixture is extremely shortened. Therefore, the seed catalyst employed in the invention can accelerate the reaction rate to nearly the same extent as the addition of a conventional catalyst, such as an acid, can do. Moreover, the reaction rate can be very easily controlled in the process of the invention, because the acceleration effect of the present seed catalyst varies with the amount of the added seed catalyst to a lesser degree than is the case when an acid catalyst is employed. This is the most advantageous aspect of the invention and has been not accomplished by the conventional processes.

The acceleration of the hydrolysis provided by the addition of the seed catalyst in the invention is based on the discovery of the fact that the reaction involves a self-catalytic reaction mechanism in an essential aspect and is realized by applying that discovery to a practical process. The mechanism of the acceleration of the reaction, however, is not clearly understood. Theoretically possible reaction mechanisms that may account for this result are set forth below. However, it will be understood that these mechanisms are merely suggestions and the invention is not limited to the correctness of them.

(i) The hydrolyzed partial condensation product as such serves as a catalyst in the hydrolysis, for instance, in the following manner.

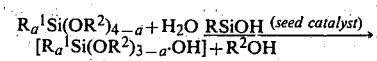

In the above equation, R is R¹, namely, siloxane or silanol hydroxyl group.

(ii) The reaction between the alkoxysilane and the seed catalyst, namely, the silanol hydroxyl group, proceeds in the following manner.

$$R_a{}^1Si(OR^2)_{4-a} + HOSi \cdot R \rightarrow R_a{}^1Si(OR^2)_{3-a} \cdot OSiR + R^2OH$$

The reaction can be carried out in the absence of a solvent or in the presence of a water-miscible organic solvent, such as an alcohol. When a solvent is not employed, the reaction mixture is in a cloudy state in the initial stage because the added water is not dissolved in both of the starting alkoxysilane and the added seed catalyst. As the reaction proceeds, the heterogeneous reaction mixture, however, begins to become homogeneous due to the alcohol produced in the course of the hydrolysis. Therefore, the progress of the reaction can be checked by measuring the period requiring for reaching the homogeneous state.

The present condensation reaction can be accelerated by removal of the by-produced alcohol from the reaction system in the course of the reaction.

The control of the degree of condensation can be achieved by controlling the reaction period and the reaction temperature, based on a measurement of the distribution of the condensation degrees of the produced organosiloxane condensation product by means of gel permeation chromatography (GPC). The distribution of the condensation degrees is obtained by calculation of the data by referring to a calibration curve made through the GPC observation on a standard molecular weight polystyrene. The distribution is closely related to a physical property of a coating film or a molded product prepared by the organopolysiloxane of the invention as well as to the stability and the hardening reactivity of the coating solution, etc. Accordingly, the conditions of the condensation reaction are so defined as to obtain a product having an appropriate property.

The hydrolyzed partial condensation product of an alkoxysilane, according to the invention, as described hereinbefore, can be advantageously employed as a principal component of a coating solution that is applied onto a plastic material so as to form an extremely hard coating film thereon. The coating composition can be prepared, for instance, by dissolving a hydrolyzed partial condensation product of an alkyltrialkoxysilane, such as methyltrimethoxysilane, in an alcohol having 1-5 carbon atoms, such as ethyl alcohol, and then dissolving the hardening catalyst completely in the thus-obtained solution. For the purpose of improving the adhesion, a solvent which is suitable for the employed base material can be added to the coating solution. Moreover, an appropriate solvent such as a medium boiling solvent or a high boiling solvent can be added to the coating solution so as to prevent dew condensation that sometimes causes clouding of the formed film.

A gelation-preventing agent such as a surface active agent or an organic carboxylic acid, a dye, a pigment, an ultraviolet absorber, an antistatic agent, etc., can be optionally added, as well. The thus-formulated coating solution is coated on the base material, and is dried and hardened under heating to form a surface coating film on the base material. Examples of suitable coating processes for applying the coating solution on the base material include the dipping process, the spraying process, etc.

The thickness of the coating film varies with the intended use of the coated product, and generally ranges from 1 to 20μ, and preferably ranges from 5 to 10μ.

The hydrolyzed partial condensation product of the alkoxysilane, according to the invention, can be hardened at a relatively low temperature and is appropriate for use for manufacturing a coated plastic material product made of a plastic material that is deformable at a relatively low temperature. The temperature for the hardening generally ranges from 50° to 140° C., and preferably ranges from 80° to 120° C. The period for the hardening generally ranges from 30 min. to 12 hrs., and preferably ranges from 2 to 5 hrs. Examples of the base plastic material to be coated include polymethyl methacrylate, polycarbonate, polystyrene, styrene-acrylonitrile copolymer, ABS resin, styrene-methyl methacrylate-butadiene copolymer, cellulose acetate, and cellulose propionate. The protective film prepared according to the process of the invention is excellent in solvent resistant property, abrasion resistant property, surface hardness, transparency and anti-stress-crazing property. The protective film that possesses such excellent properties as above is sufficiently durable under such severe conditions as in the processing and practical use of sunglass lenses.

In addition to the purpose for preparing the surface hardened film described above, the present coating composition as such can be employed for forming a molded product having a relatively great thickness.

The present invention will be further described by reference to the following illustrative examples, but these examples do not limit the invention.

EXAMPLE 1

Preparation of Seed Catalyst Solution

In a 50 ml. flask equipped with a stirring device were placed 15.9 g. of methyltriethoxysilane and 5.6 g. of water, and stirring was performed at 80° C. The reaction mixture was heterogeneous in the initial stage because the incorporated water was not miscible with the methyltriethoxysilane, but after 40 minutes, the mixture became homogeneous. Then, the reaction was continued for an additional 2 hours to give a seed catalyst solution. The thus-obtained seed solution (A) was an ethanol/water solution containing a hydrolyzed partial condensation product of the alkoxysilane in the amount of 6 g., this value being calculated on the hydrolyzed full condensation product of the methyltriethoxysilane ($H_3CSiO_{1.5}$) basis.

Hydrolytic Condensation Reaction of Alkoxysilane

Figure 1:
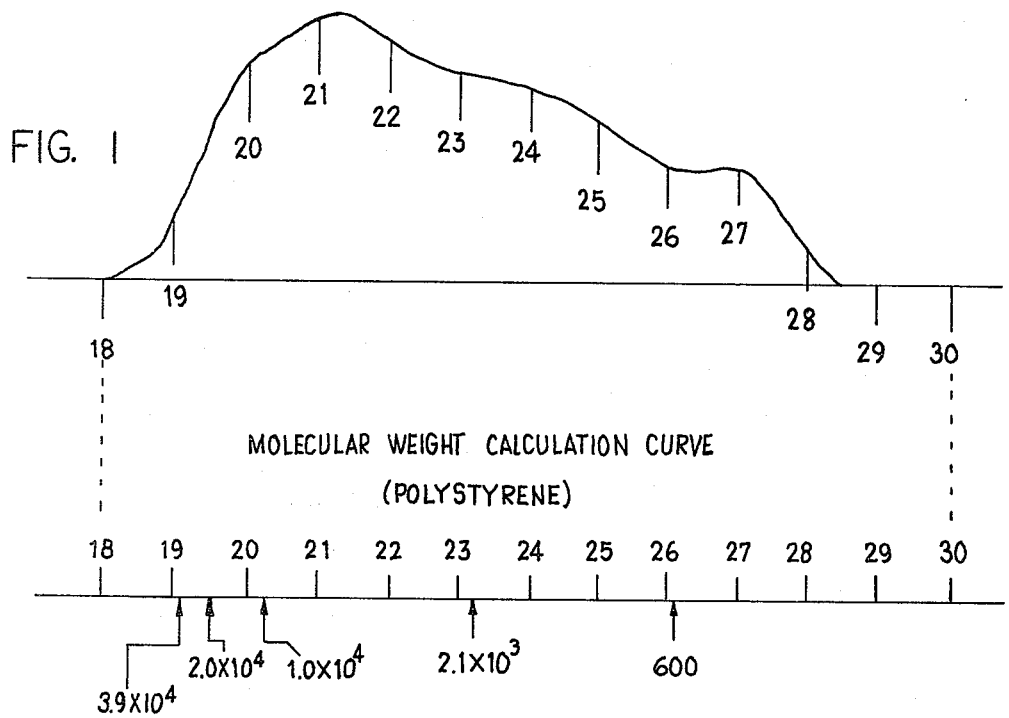
FIGS. 1 and 2 show gel permeation chromatograms of the prepolymers obtained in Examples 1 and 2, respectively.

In a 100 ml. three-necked flask equipped with a stirrer, a reflux condenser and a thermometer were placed 60 g. of methyltriethoxysilane, 21 g. of water and one-tenth of the amount of the seed solution (A) [one part by weight of the seed catalyst (calculated on the $CH_3SiO_{1.5}$ basis)], and stirring was done at 60° C. by rotating an agitator at a rotation rate of 400 r.p.m. The reaction mixture became homogeneous after 35 minutes, and the reaction was further continued for 3 hours and 25 minutes at 60° C. The reaction mixture was then heated to concentrate same by removing 37 g. of a distillate over a period of about 30 minutes. The reaction was continued at 60° C. for 2 hours to give a homogeneous solution (B) containing a hydrolyzed condensation product of the alkoxysilane. After the reaction mixture became homogeneous, small portions of the mixture were removed at timed intervals for sampling. Each sample was diluted with tetrahydrofuran until the volume concentration reached 2%, and the molecular weight distribution at 40° C. was determined by means of a gel permeation chromatography apparatus (GPC model 200 produced by Waters Associates). The progress of the polymerization caused by the condensation reaction relative to the duration of the reaction period was confirmed. The result of the GPC determination on the finally obtained reaction solution (B) is shown in FIG. 1.

The reaction solution (B) amounted to 45.5 g. An original coating solution was prepared by adding 6.9 g. of ethanol to the reaction solution (B). The solid content of the original coating solution was 50%.

A final coating solution was prepared in the following formulation.

| Original coating solution | 100 part by weight |
| Tetraethylammonium hydroxide | 0.2 part by weight |
| Acetic acid | 28.3 part by weight |
| Ethanol | 38.3 part by weight |

The acetic acid was incorporated to prevent gelation of the coating solution, to prolong the pot life and further to improve the adhesion to a plastic base material. A molded lens made of polymethyl methacrylate was washed to remove fatty substances, dipped in the coating solution and taken out of the solution at a rate of 25 cm/min. The thus-coated solution was hardened under heating at 90° C. for 5 hours. The lens having the thus-hardened surface was excellent in solvent resistance, surface hardness, adhesion, abrasion resistance, light transmission, etc., and it can be employed for practical purposes.

COMPARATIVE EXAMPLE 1

The hydrolysis condensation reaction of the alkoxysilane described in Example 1 was repeated except that the seed solution (A) was not employed. In this reaction, it took 1 hour and 22 minutes for the reaction mixture to reach a homogeneous state. Therefore, the acceleration of the hydrolysis provided by the addition of the seed catalyst is evident.

EXAMPLE 2

To 60 g. of methyltriethoxysilane and 21 g. of water was added the seed catalyst of the reaction solution (B), prepared in Example 1, in amounts of 0.9 g., 1.8 g. and 3.6 g. (0.5, 1.0 and 2.0 parts by weight, respectively, according to the calculation on $H_3C \cdot Si \cdot O_{1.5}$ basis), and the reaction was performed at 40° C. under stirring, as in Example 1. A homogeneous state was achieved in 2 hrs. and 2 min., 2 hrs. and 3 min., and 2 hrs. and 5 min., respectively. Thus, the reactions were significantly accelerated in comparison with the reaction described in the following Comparative Example 2, but the degree of acceleration was not significantly dependent on the amount of the added seed catalyst. Each of the reactions was carried out at 40° C. for 4 hours, and then 35 g. of the by-produced ethanol was distilled off under reduced pressure, at 40° C. and over the period of about 1 hour. Each reaction mixture was subjected to a condensation reaction at 40° C. for 2 hours to obtain a hydrolyzed partial condensation product of methyltriethoxysilane. Each product was coated on a molded lens made of polymethyl methacrylate in the same manner as described in Example 1 and heated to 90° C. for 5 hours to form an extremely hard coating film.

Figure 2:
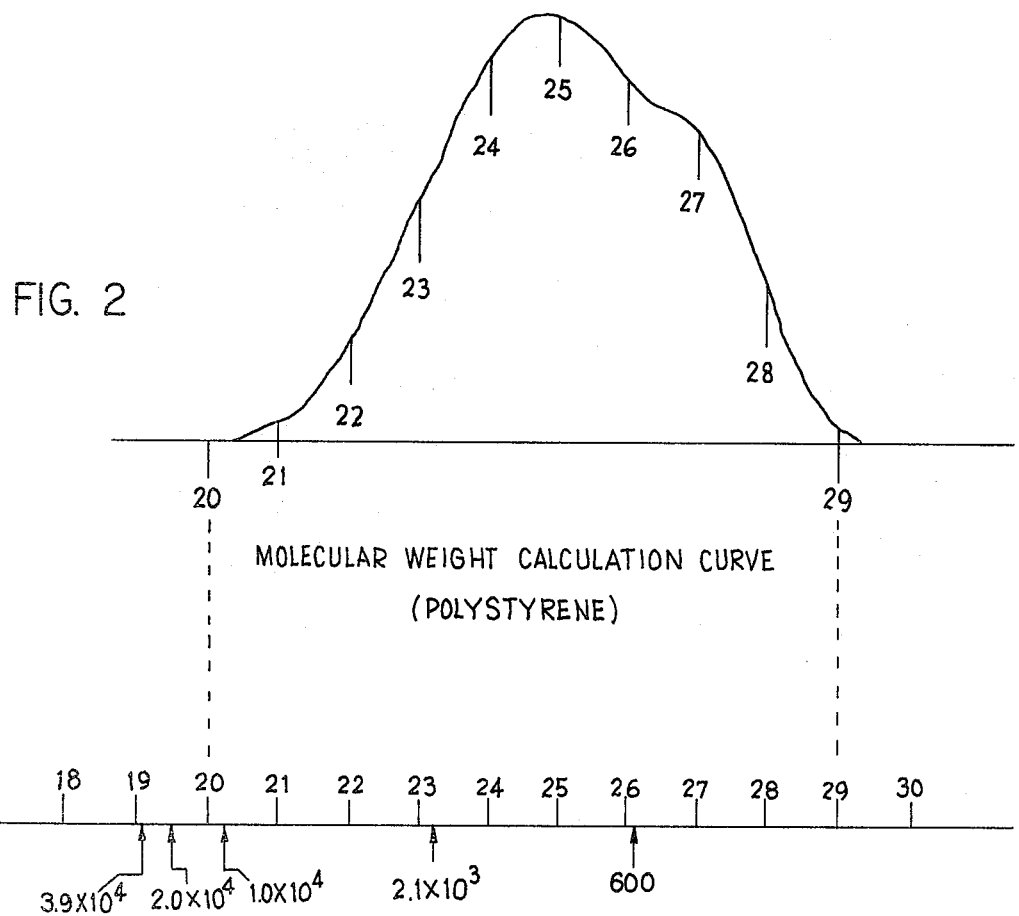

The coating solutions having the formulations similar to the formulation of Example 1 were allowed to stand at room temperature for more than 1 month, and then their viscosity was measured by means of a B type rotary viscometer. The viscosity of each solution exhibited little change as a result of the standing at room temperature. The GPC curve of the hydrolyzed partial condensation product of methyltriethoxysilane obtained in the present example is shown in FIG. 2.

COMPARATIVE EXAMPLE 2

The reaction of Example 2 was repeated except that the seed catalyst was not employed. The period required for the reaction mixture to reach a homogeneous state at 40° C. was 4 hours and 1 minute.

COMPARATIVE EXAMPLE 3

This example is a comparative example in relation to Example 2. Into each of a pair of 100 ml. flasks X and Y was introduced 60 g. of methyltriethoxysilane. Into the flask X was introduced 21 g. of water containing 15 ppm of HCl, and into the flask Y was introduced 21 g. of water containing 30 ppm of HCl. Each reaction mixture was heated to 40° C.

The former reaction mixture (flask X) became homogeneous at 1 hour and 6 minutes after the beginning of the reaction, and the latter one (flask Y) became homogeneous at 24 minutes. Each reaction mixture was subjected to reaction under the same conditions as described in Example 1 and then a coating solution was prepared in the same manner as described in Example 1. The thus-obtained coating solutions were coated on molded polymethyl methacrylate lenses and hardened under heating at 90° C. for 5 hours. Then, the properties of the coating films were evaluated. The film from the former solution (flask X) was slightly high in the surface hardness in comparison with the film obtained from the latter solution (flask Y), but the former film was apt to be cracked.

This means that the reaction employing an acid catalyst scarcely has reproducibility because the reaction rate is greatly dependent on variation of the amount of the acid catalyst and also the physical properties of the film are greatly dependent on such variation.

EXAMPLE 3

The reaction of Example 2 was repeated at 30° C., except that the seed catalyst was the Glass resin #650 (hydrolyzed partial condensation product of trialkoxysilane, manufactured by Owens Illinois, Inc.) in the amount of 1.8 g. which was incorporated by dissolving same in the starting compound. The period required to reach a homogeneous state was 3 hours and 22 minutes.

COMPARATIVE EXAMPLE 4

The reaction of Example 3 was repeated at 30° C., except that no seed catalyst was employed. The period required to reach a homogeneous state was approximately 5 hours and 30 minutes.

EXAMPLE 4

In a 1 liter three-necked separable flask equipped with a stirrer, a reflux condenser and a thermometer were placed 360 g. of methyltriethoxysilane, 126 g. of water and 5 g. of the reaction solution (B) obtained in Example 1 and employed as the seed catalyst, and the reaction mixture was heated at 80° C. under stirring. After 18 minutes, the reaction mixture became homogeneous. The reaction was further continued for 4 hours, and 222 g. of a mixture of ethanol and water was distilled off over a period of about 1 hour. The reaction was continued at 80° C. for additional 2 hours, and then was complete. The reaction solution was divided into three portions, and each was subjected to evaporation under reduced pressure for 15 minutes at 80° C. in a rotary evaporator for removing the solvent. Each of the partial condensation products of the organopolysiloxane thus obtained was dissolved in tetrahydrofuran to make a 5% by weight solution. The solution was filtered on a 150 mesh wire net and was dried. The dried sample was measured to determine its gel content. All three samples contained 0.4% by weight of gel, which is a significantly low level.

COMPARATIVE EXAMPLE 5

The procedure of Example 4 was repeated except that 5.3 mg. of concentrated hydrochloric acid was added to the water to be incorporated (about 15 ppm as HCl) in place of incorporating the seed catalyst. The gel content was 4.0, 6.5 and 12.0% by weight in the three samples. Thus, the variation of gel content was very prominent.

EXAMPLE 5

This example relates to a block copolymerization process of a silane containing three or four functional groups and shows an embodiment of the seed reaction process according to the invention.

In a 100 ml. flask as described in Example 1 were placed 27 g. of the Glass resin #650 (hydrolyzed partial condensation product of trialkoxysilane, manufactured by Owens Illinois, Inc.) and 27 g. of ethanol, and the mixture was made into a solution. To the solution were added 3 g. of tetraethoxysilane and 3 g. of distilled water. The reaction mixture was heated to 80° C. for 4 hours under stirring to undergo hydrolysis and dehydrating condensation reaction. Thus, an ethanolic solution of a block copolycondensate was obtained. A coating solution was formulated in the same manner as in Example 1, coated on a polymethyl methacrylate molded lens, and hardened under heating at 90° C. for 5 hours. The thus-obtained coating film was transparent and solvent-resistant, and had a hardness corresponding to a 5 H pencil.

EXAMPLE 6

The reaction of Example 4 was repeated except that 18 g. of polydimethylsiloxane having hydroxyl groups at both ends of the molecular structure (condensation ratio: 20) was additionally incorporated into the mixture. The solution was then coated on a molded lens made of polymethyl methacrylate, as in Example 1. The thus-obtained film was more excellent in the adhesion property than the one obtained in Example 1.

EXAMPLE 7

In the same apparatus as described in Example 4 were placed 240 g. of methyltriethoxysilane, 160 g. of phenyltriethoxysilane, 126 g. of water and 5 g. of the reaction solution (B) obtained in Example 1 and serving as the seed catalyst. The reaction was initiated and after 25 minutes the solution became homogeneous. At that time, 200 g. of ethyl cellosolve was added, and then the reaction was done under the same conditions as described in Example 4 to yield a copolycondensate of the organopolysiloxane in the form of a solution.

The embodiments of the invention in which an exclusive property or privilege is claimed are defined as follows:

1. In a process for preparing a thermosetting organopolysiloxane which is soluble in an organic solvent, which comprises effecting, in the presence of a catalyst, a hydrolysis and condensation reaction of one or a mixture of two or more alkoxysilanes having the formula

$$R_a^1 Si(OR^2)_{4-a}$$

in which $R^1$ is alkyl, substituted alkyl, alkenyl or aryl, $R^2$ is alkyl having 1 to 4 carbon atoms and a is an integer of 0, 1 or 2, in which the reaction system for said hydrolysis and condensation reaction contains from $4-a/2$ to 10 moles of water, per mole of said alkoxysilane, until said thermosetting organopolysiloxane is obtained, the improvement wherein the catalyst is a hydrolyzed partial condensation product of a trialkoxysilane which is soluble in an organic solvent and which has the formula $R^1Si(OR^2)_3$, wherein $R^1$ and $R^2$ have the same meanings as defined above, said catalyst being present in the reaction system for the beginning of said hydrolysis and condensation reaction in an amount at least 0.1 part by weight, per 100 parts by weight of said alkoxysilane.

2. A process as claimed in claim 1, in which said hydrolyzed partial condensation product of said trialkoxysilane is the sole catalyst employed in said hydrolysis and condensation reaction.

3. A process as claimed in claim 1 in which said alkoxysilane is selected from the group consisting of dimethyldiethoxysilane, diethyldiethoxysilane, methyltriethoxysilane, ethyltriethoxysilane, γ-glycidoxypropyltrimethoxysilane, γ-methacryloxytrimethoxysilane, N-β-aminoethyl-γ-aminopropyltrimethoxysilane, vinyltriethoxysilane, phenyltriethoxysilane, tetraethoxysilane and tetrabutoxysilane.

4. A process as claimed in claim 1 in which the amount of said catalyst is at least 0.5 part by weight, per 100 parts by weight of said alkoxysilane.

5. A process as claimed in claim 1 in which the reaction system for said hydrolysis and condensation reaction contains from 2 to 5 moles of water, per mole of said alkoxysilane.

* * * * *

UNITED STATES PATENT AND TRADEMARK OFFICE
CERTIFICATE OF CORRECTION

PATENT NO. : 4 308 371
DATED : December 29, 1981
INVENTOR(S) : Kazunobu Tanaka and Koichiro Arita It is certified that error appears in the above—identified patent and that said Letters Patent is hereby corrected as shown below:

Column 10, Line 25; change the formula to read as follows:

--- $R^1_a Si(OR^2)_{4-a}$ ---.

Column 10, Line 39; change "for" to ---from---.

Signed and Sealed this

Twentieth Day of April 1982

[SEAL]

Attest:

GERALD J. MOSSINGHOFF

*Attesting Officer*   *Commissioner of Patents and Trademarks*